May 6, 1930.  A. P. HITZEMAN  1,757,836
LIQUID DISPENSING APPARATUS
Filed April 2, 1929   3 Sheets-Sheet 2
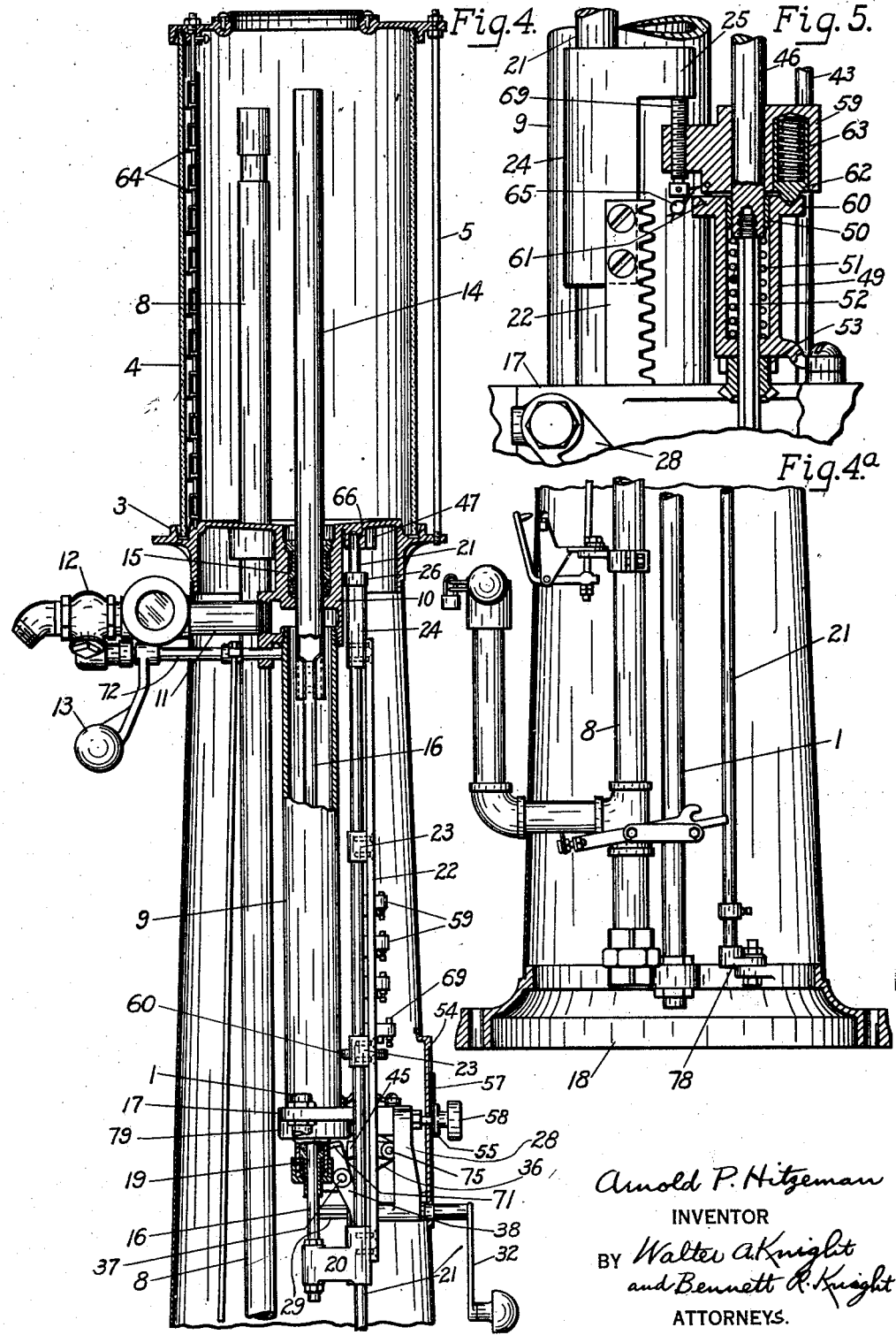
Arnold P. Hitzeman
INVENTOR
BY Walter A. Knight
and Bennett R. Knight
ATTORNEYS.

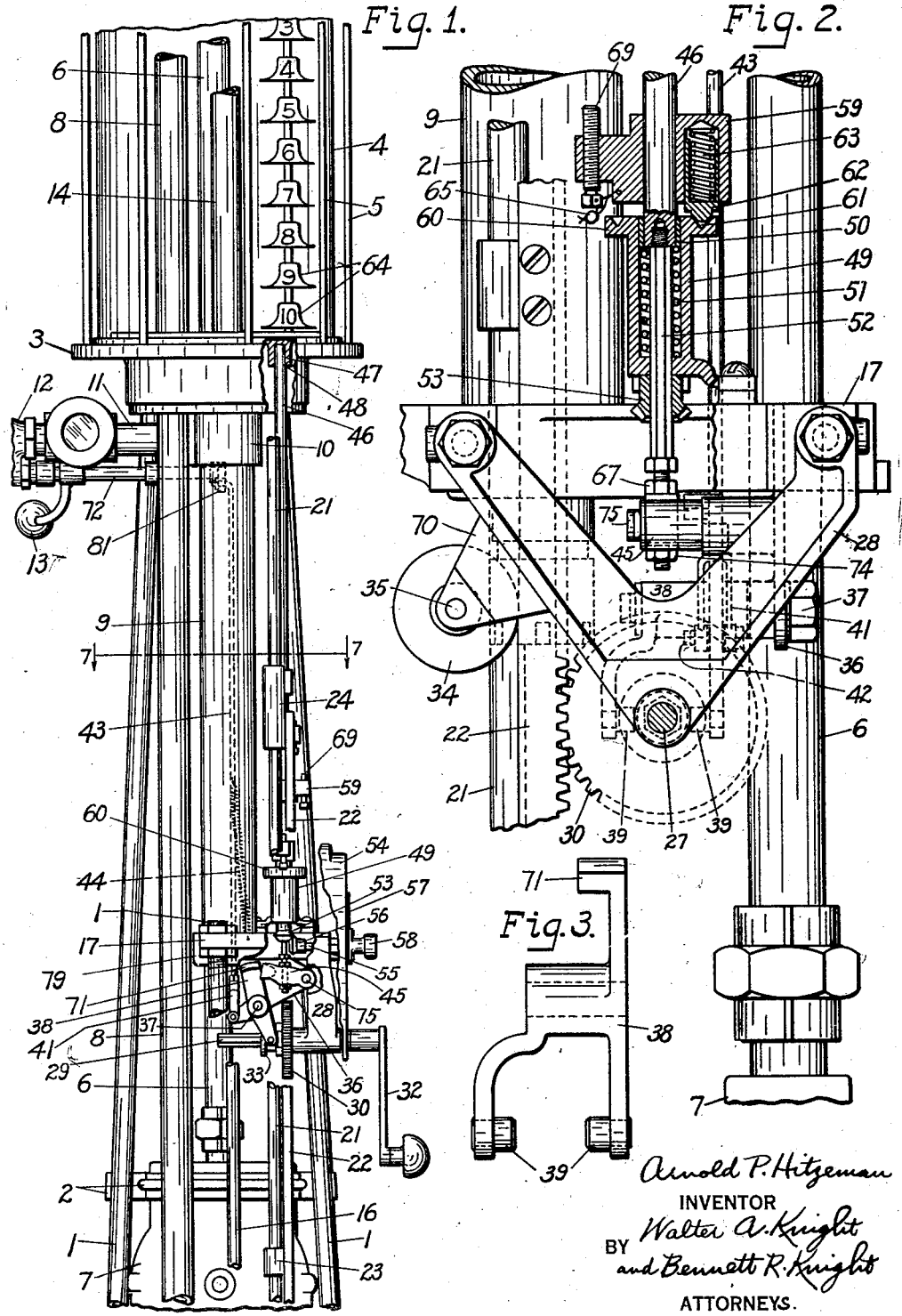

May 6, 1930.  A. P. HITZEMAN  1,757,836
LIQUID DISPENSING APPARATUS
Filed April 2, 1929    3 Sheets-Sheet 3
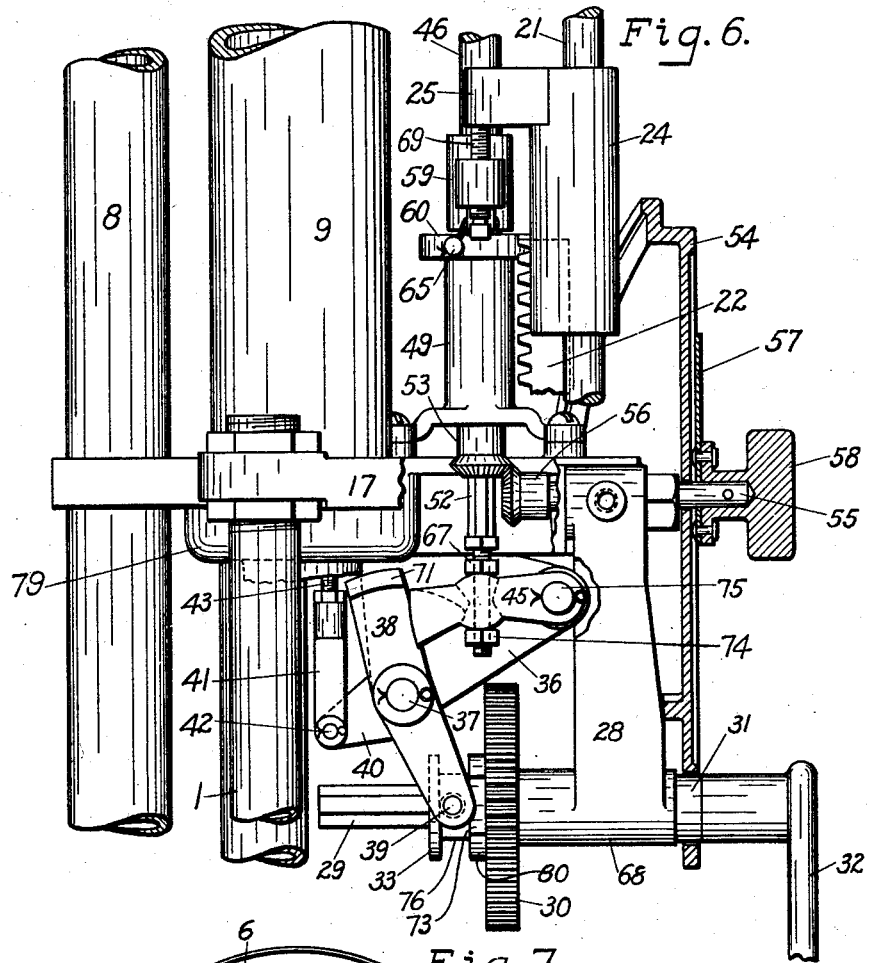
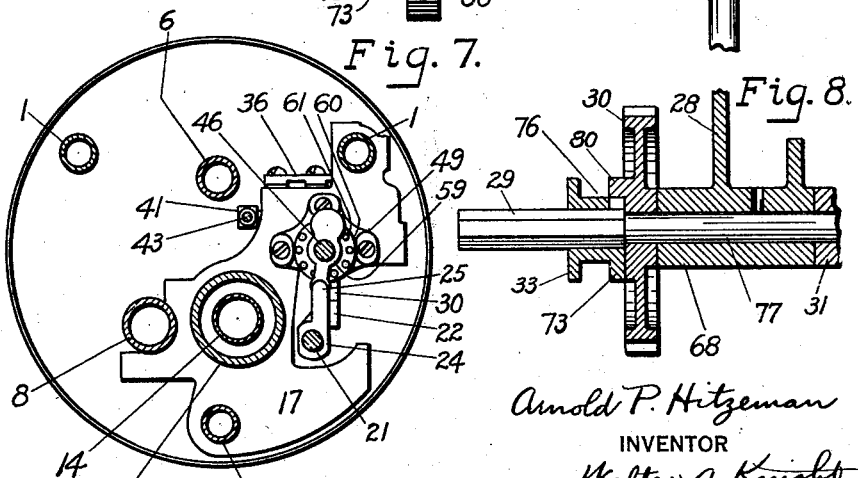
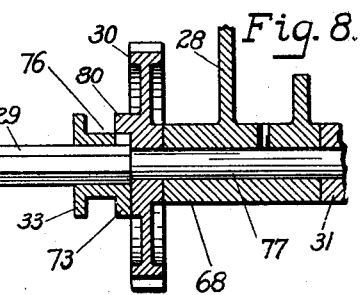
Arnold P. Hitzeman
INVENTOR
BY Walter A. Knight
and Bennett R. Knight
ATTORNEYS.

Patented May 6, 1930

1,757,836

UNITED STATES PATENT OFFICE

ARNOLD P. HITZEMAN, OF FORT WAYNE, INDIANA, ASSIGNOR TO WAYNE COMPANY, OF FORT WAYNE, INDIANA, A CORPORATION OF INDIANA

LIQUID-DISPENSING APPARATUS

Application filed April 2, 1929. Serial No. 351,846.

My invention relates to the positive stop type of so-called visible liquid measuring and dispensing apparatus, that is, apparatus having a transparent elevated container within the view of the customer from which liquid is to be dispensed, and used extensively for serving gasoline.

Such apparatus is provided with a tube vertically adjustable within said container through which liquid may be withdrawn therefrom. This vertically adjustable tube may be used either to serve liquid from the container to the purchaser or to drain back to storage liquid from the container to a desired level before any liquid is served to the purchaser from the container.

Many types of such visible dispensing apparatus used in serving gasoline to automobile tanks, permit the opening of the serve valve while the vertically adjustable tube is not in position to serve the predetermined number of units of gasoline ordered, and also permit the tube to be adjusted while the serve valve is open. Where either of these conditions occurs in a dispensing apparatus having an adjustable serve tube the customer may be cheated. Where either of these conditions occurs in an apparatus having an adjustable overflow tube, either the purchaser or the filling station owner may be cheated.

The principal object of my invention is to provide means for preventing the opening of the serve valve at all times except when the stop mechanism has been adjusted to a predetermined setting for delivering a measured quantity of liquid from said container. In addition to the above described correct setting it is necessary to lower the vertically adjustable tube to the predetermined setting before the serve valve can be opened.

Another object of my invention is to prevent any change in position of the vertically adjustable tube within the container while the serve valve is open.

The particular embodiment of my invention selected for illustration is here shown applied to a visible liquid measuring and dispensing apparatus having a unitary serve tube slidably adjustable through the bottom of the head of the elevated container; in which:—

Fig. 1 is a side elevation of the apparatus, with the casing off and the top and bottom broken away;

Fig. 2, an enlarged detail is a front elevation of the rack and its gear, the bottom of the stop-rod mechanism and attendant parts being shown in section;

Fig. 3, a further enlarged detail, is a side view of the forked clutch shifter;

Figs. 4 and 4$^a$ show the upper and lower parts respectively, broken apart, enlarged and, in side elevation, and parts in section to better illustrate the sliding tube mechanism, and rack guide-rod;

Fig. 5, an enlarged detail, is a front elevation of the mechanism at the bottom of the stop-rod when said rod is in lowest position, with parts in section;

Fig. 6, an enlarged detail is a side elevation of the clutch mechanism and means for rotating the stop-rod and attendant parts with part of the sliding tube crank broken away, and with the fragment of the rack turned 90° to the right;

Fig. 7 is a section on the line 7—7 of Fig. 1 (enlarged) with the casing added as in Fig. 4, and Fig. 8, is an enlarged detail of part of the rack gear and clutch mechanism in section, with the shaft shown in full line.

Referring now to the drawings, 1, 1, 1, are tubular supports forming the supporting structure of the pedestal, all secured at the bottom to a base plate 18, one secured at its top to the brace plate 17 and two secured at their tops to the bottom head 3 of the glass elevated liquid container 4, held in place between said bottom head and a top head by tie-rods 5.

A fill pipe 6 connects the pump 7, which draws gasoline from a storage tank (not shown) with the container 4. The pump 7 is secured to the supports 1 by brace 2. A fixed overflow pipe 8 terminating at its top within the container 4 draws gasoline in excess of the maximum quantity to be delivered at any one serving back to the storage tank (not shown).

A well 9 is connected at its top with the hollow boss 10 of the bottom head 3 and its bottom is formed at 79 in the brace plate 17. The draw-off pipe 11 controlled by the self-closing serve valve 12, with weighted lever 13, is in open connection with the boss 10. A serve tube 14 open at both ends passes through a stuffing box 15 in the floor of the bottom head 3, is positioned axially of the well 9 and is adapted to be raised and lowered by means of the rod 16 secured to the bottom of serve tube 14, which rod passes through a stuffing box 19 in the bottom end 79 of the well 9.

At its lower end the rod 16 is fixed to a cross-head 20. A rack guide rod 21 is secured to the base plate 18 below at 78 and to the bottom head 3 above at 66. A rack 22 is secured at its lower end to cross-head 20, intermediate of its length to guides 23, 23 and at its top to guide 24. Cross-head 20 and guides 23, 23 and 24 are slidably mounted on the rack guide-rod 21. The guide 24 has a stop-lug 25 adapted to engage whichever of the stops hereinafter described is adjusted so as to be at that time positioned in the path of said lug. A stop 26 is fixed to the rack guide-rod 21 to limit the upward movement of the rack whenever the guide 24 collides with it.

To the brace plate 17 is secured the V-shaped bracket 28, in the lower portion 68 of which is journaled the shaft 27, on the round portion 67 of which shaft is mounted the loose rack-gear 30.

A collar 31 is fixed to the shaft 27 and to the outer end of shaft 27 is fixed the crank 32 by which the shaft 27 is rotated to raise and lower the rack 22. The inner end 29 of the shaft 27 is hexagonal in cross section and on this portion is mounted the clutch 33. Clutch teeth 73, and 80, on the contiguous faces of the clutch 33 and gear 30 respectively provide means for rotating the gear 30 by means of the shaft 27 when the clutch 33 is in the position shown in Fig. 8.

A supporting and guiding roll 34 is rotatably mounted on a stud 35 fixed to the projecting portion 70 of the V-shaped bracket 28, and this roll bears against the back of the gear-rack 22 substantially opposite the gear 30.

A bracket 36 is fixed to the brace plate 17. On a stud bolt 37 fixed to the bracket 36 is pivoted a forked shifter 38 with pins 39, 39, adapted to fit in the annular groove 76 of the clutch 33.

To a lug 40 on the shifter 38 is pivoted at 42 a forked connector 41 into which is threaded for longitudinal adjustment the pull-rod 43. The rod 43 is secured at its upper end to a crank 81 which crank is fixed at its other end to the stem 72 of the serve-valve 12. One end of spring 44 is secured to the rod 43 and the other end to the brace-plate 17 to assist in keeping the clutch teeth 73 in mesh with clutch teeth 80 at all times except when positively separated by shifting the clutch as will be hereinafter described.

There is a lug 71 on the upper end of the shifter 38 adapted to be dogged by the guard 45, at all times except when the stop-rod 46 is in its lowest position. The guard 45 is pivoted to the stud 75 which is secured to the bracket 36.

The top end of the stop-rod 46 is axially adjustable in a socket 48 formed in a boss 47 on the under side of the bottom head 3, and the lower end in a socket member 49 fixed to the brace-plate 17. This lower end of the stop-rod 46 is guided by the sleeve 50, rests on a coiled spring 51 and the hexagonal rod 52 is secured to it. Rod 52 passes through the beveled gear 53 and is axially movable therethrough. At its lower end the rod 52 loosely pierces guard 45 and the guard is properly adjusted as to height by means of nuts 67, 74.

A dial plate 54, with suitable figures thereon to indicate measured units of gasoline, is fixed to the bracket 28 or any other convenient part of the structure. A shaft 55 is journaled in the brace-plate 17, carries on its inner end a beveled gear 56 constantly in mesh with the gear 53, passes outwardly through the dial plate 54, has the pointer 57 fixed to it, and to its outer end is fixed the setting knob 58, by which the stop-rod is rotated. It will be obvious that another dial may be provided on the opposite side of the apparatus and if this is done there will be a beveled gear meshing with gear 53, with a shaft and pointer for that dial, but one knob 58 will operate the pointer on both dials.

Fixed to the stop-rod 46, each at a different arcuate position on its circumference, are a plurality of stops 59. The stops are spaced apart on the stop-rod 46 a distance substantially equal to one unit of measure, generally in the United States a gallon, in the container 4, and each stop has a vertically adjustable screw 69 against the top of which, when the stop-rod 46 is properly adjusted radially, the lug 25 strikes when the rack 22 has been sufficiently lowered.

The socket member 49, has at its top an outwardly extending circumferential flange 60 in the top surface of which are a plurality of depressions 61, one for each of the angular positions to which the stop-rod 46 is to be adjusted. The lowermost stop 59 is bored from underneath to receive a positioning plunger 62, constantly held against the flange 60 by the pressure of the coiled spring 63. Then further lowering of the rack presses the stop-rod 46 to its extreme low position compressing the springs 51 and 63.

It will be understood that one of the stops is in position to properly engage the lug 25, when and only when, the plunger is seated in one of the depressions 61. Until the stop-rod 46 is so placed in extreme low position the parts 38 and 45 are in the positions shown in Fig. 1, that is with the free end of the guard 45 impinging upon the lug 71 of clutch shifter 38 preventing the clutch 33 from being disengaged from the gear 30. But when the stop-rod 46 has been completely depressed the parts are in the position shown in Figs. 5 and 6, that is with the free end of the guard 45 lowered out of contact with the lug 71 permitting the clutch 33 to be shifted to the left whenever the serve-valve 12 is opened, by raising its weighted lever 13.

The operation of the apparatus is as follows:

Assuming that the parts are in the positions shown in Figs. 4 and 4ª, that the container 4 has been filled with gasoline to a point above the top end of the overflow pipe 8 and that excess gasoline above this level has been conveyed back through the overflow pipe 8 to the storage tank (not shown).

The customer drives up in his automobile to a position contiguous to this dispensing apparatus and orders ten gallons of gasoline supplied to his car tank. The filling station operator rotates the knob 58 and through shaft 55, gear 56, gear 53 and shaft 52 rotates the stop-rod 46 until the lowermost of the stops 59 has the top of its adjustable screw 69 in the path of the lug 25 on the guide 24. The positioning plunger 62 then rests in the appropriate depression 61.

The crank 32 is then rotated counterclockwise and through the shaft 27 and gear 30 the rack 22 is lowered until the lug 25 collides with the top of the adjustable screw 69 of the lowermost stop 59, and this rotation is continued until the spring 51 is compressed bringing the stop-rod 46 to its lowest position, at the same time compressing the spring 63 causing the top end of the plunger 62 to seat solidly against the top of the bored recess in which it is seated. The lower end of the plunger 62 then acts as a pin, positively preventing the rotation of the stop-rod 46 so long as it remains in its lowest position.

The shaft 52 has then depressed the guard 45 carrying its free end downwardly until it is clear of the lug 71. (The position shown in Fig. 6.)

Simultaneously with the lowering of the lug the serve-tube 14 has been lowered to its lowest position, that is, to a point where it will permit the flow of the ten gallons of gasoline from the container 4 into the top of said serve-tube 14 and out of the bottom of the serve-tube into the well 9 where it may flow freely through the draw-off pipe 11 into the serve hose not shown whenever the serve valve 12 is open.

The filling station operator then grasps the weighted lever 13 pushes it upwardly, rotating the valve rod 72 to open the serve-valve 12, and simultaneously shifting the clutch 33 so that its teeth 73 are out of mesh with the clutch teeth 80 of the gear 30; through the medium of the crank 81, rod 43 and clutch shifter 38.

Obviously while the serve-valve 12 is held open re-adjustment of the serve-tube 14 is impossible because the rotation of the crank 32 is ineffective so long as the clutch 33 is thrown out. The customer therefore needs exercise no care except to see that gasoline has drained from the container 4 down to the level of numeral 10 (see Fig. 1) on the scale or indicator 64.

As soon as the serving is completed, the operator lets go of the lever 13, it drops of its own weight and the teeth 73 of the clutch 33 again mesh with the teeth 80 of the gear 30.

The knob 58 cannot again be rotated because the lower end of the then firmly seated plunger 62 rests in the depression 61 and acts as a pin, until the rod has been raised, by clockwise rotation of the crank 32, at least enough to expand the spring 63. Simultaneously the spring 51 expands with the lifting of the stop-rod and such lifting simultaneously raises guard 45 so that it dogs the lug 71 and will not permit shifter 38 to throw the clutch 33 out of engaging position. It will be obvious that the serve tube will be raised preparatory to refilling the container.

From this it will be seen that all of the advantages claimed at the beginning of this specification are provided and fully protect both the purchaser of gasoline dispensed from the apparatus and the filling station operator, as neither too much nor too little gasoline can be served on any setting so long as the adjustable screws are in their correct positions, as evidenced by the wire and seal 65.

Although a preferred form of the invention has been shown and described it will be understood that a mechanic working within the scope of what is claimed may make changes without departing from the spirit of my invention.

I claim as my invention and desire to secure by Letters Patent of the United States:—

1. In a liquid dispensing apparatus, the combination of a visible elevated container from which liquid is dispensed, means for supplying liquid to said container, means for draining back to storage excess liquid so supplied, a conduit whose top is within said container and through which conduit the liquid flows from said container, a conduit through which liquid is served, a normally closed serve-valve for said conduit through which liquid is served, serve-valve opening means, a quantity stop whose lateral position may be changed, a supporting member to which said stop is secured, a resilient mounting for one end of said member, a reciprocable lug to engage said stop when said lug is moving toward said resilient mounting, means for changing the lateral position of said stop to bring it into or out of the path of said lug, means for preventing lateral re-adjustment of said stop when the lug has engaged said stop and forced its supporting member to rest in said resilient mounting, means for simultaneously adjusting the height of the top of said conduit and the vertical position of said lug, means for maintaining the conduit and lug reciprocating means in operative condition until the mechanism is adjusted to position to serve the correct quantity of liquid, and means operable by said serve-valve opening means for disengaging said conduit and lug height adjusting means when the mechanism is adjusted to serve correct quantities of liquid.

2. In a liquid dispensing apparatus the combination of a visible elevated container from which liquid is dispensed, means for supplying liquid to said container, means for draining back to storage excess liquid so supplied, a conduit whose top is within said container and through which conduit the liquid flows from said container, a conduit through which liquid is served, a normally closed serve-valve for said conduit through which liquid is served, serve-valve opening means, a vertically positioned rotatable stop-rod, a resilient mounting for the lower end of said stop-rod, a plurality of stops fixed to said stop-rod on different radii thereof at the several heights required for a desired unit and groups of units of measure, a lug to engage the top of said stops, means for reciprocating said lug in a plane substantially parallel with said stop-rod and contiguous thereto, means for rotating said stop-rod to aline any of said quantity stops with said lug, means for preventing the radial re-adjustment of said stop-rod when said lug has engaged one of said stops and forced the stop-rod to rest in said resilient mounting, means for simultaneously adjusting the height of the top of said conduit and the vertical position of said lug, means for maintaining the conduit and lug reciprocating means in operative condition until the mechanism is adjusted to position to serve the correct quantity of liquid, and means operable by said serve-valve opening means for disengaging said conduit and lug height adjusting means when the mechanism is adjusted to serve correct quantities of liquid.

3. In combination with a liquid dispensing apparatus having in combination; an elevated container from which liquid is dispensed, means for supplying liquid to said container, means for draining back to storage excess liquid from said container, a conduit whose top is vertically adjustable within said container, a rod by which said conduit is so adjusted, a serve conduit and a normally closed serve-valve therefor, a rack, a cross-head connecting said rod and said rack, a lug on said rack, a shaft, a rack-gear loose on said shaft, a clutch rotatable with said shaft and adapted to engage said gear, a shifter for said clutch, means for rotating said shaft, a stop-rod substantially parallel with and in proximity to said rack, a resilient mounting for the bottom of said stop-rod, quantity stops on said stop-rod each on a different radius thereof and adapted to engage said lug, means for rotating said stop-rod, guard means operable by said stop-rod to dog the shifter and prevent the shifting of said clutch except when the stop-rod is in lowest position, means for preventing the rotation of said stop-rod when said stop-rod is in lowest position, serve-valve opening means, and means operable by said serve-valve opening means for shifting said shifter and opening the clutch when said stop-rod is in lowest position.

4. In combination with a liquid dispensing apparatus having in combination; an elevated container from which liquid is dispensed, a well into which liquid flows from said container, a conduit whose top is vertically adjustable within said container and through which conduit the liquid flows from said container into said well, a rod by which said conduit is so adjusted, a serve conduit in open communication with said well and a normally closed serve-valve therefor, a rack, a cross-head connecting said rod and said rack, a lug on said rack, a shaft, a rack-gear loose on said shaft, a clutch rotatable with said shaft and adapted to engage said gear, a shifter for said clutch, means for rotating said shaft, a stop-rod substantially parallel with and in proximity to said rack, a resilient mounting for the bottom of said stop-rod, quantity stops on said stop-rod each on a different radius thereof and adapted to engage said lug, means for rotating said stop-rod, guard means operable by said stop-rod to dog the shifter and prevent the shifting of said clutch except when the stop-rod is in lowest position, means for preventing the rotation of said stop-rod when said stop-rod is in lowest position, serve-valve opening means, and means operable by said serve-valve opening means for shifting said shifter and opening the clutch when said stop-rod is in lowest position.

5. In combination with a liquid dispensing apparatus having in combination; an elevated container from which liquid is dispensed, means for supplying liquid to said container, means for draining back to storage excess liquid so supplied, a well into which liquid flows from said container, a vertically adjustable unitary tube whose top is within said container and through which tube the liquid flows from said container into said well, a stuffing box between said tube and said well top, a rod by which said tube is so adjusted, a stuffing box in the bottom of said well for said rod, a serve conduit in open communication with said well and a normally closed serve-valve therefor, a rack, a cross-head connecting said rod and said rack, a lug on said rack, a shaft, a rack-gear loose on said shaft, a clutch rotatable with said shaft and adapted to engage said gear, a shifter for said clutch, means for rotating said shaft, a stop-rod substantially parallel with and in proximity to said rack, a resilient mounting for the bottom of said stop-rod, quantity stops on said stop-rod each on a different radius thereof and adapted to engage said lug, means for rotating said stop-rod, guard means operable by said stop-rod to dog the shifter and prevent the shifting of said clutch except when the stop-rod is in lowest position, means for preventing the rotation of said stop-rod when said stop-rod is in lowest position, serve-valve opening means, and means operable by said serve-valve opening means for shifting said shifter and opening the clutch when said stop-rod is in lowest position.

6. In a liquid dispensing apparatus the combination of a visible elevated container from which liquid is dispensed, means for supplying liquid to said container, means for draining back to storage excess liquid so supplied, a conduit whose top is within said container and through which conduit the liquid flows from said container, a rod for adjusting the vertical position of the top of said conduit, a conduit through which liquid is served, a normally closed serve-valve for said conduit through which liquid is served, serve-valve opening means, a vertically positioned rotatable stop-rod, a resilient mounting for the lower end of said stop-rod, a plurality of stops fixed to said stop-rod on different radii thereof at the several heights required for a desired unit and groups of units of measure, a lug to engage the top of said stops, a rack substantially parallel with and contiguous to said stop-rod on which rack said lug is fixed, a shaft fixed to the bottom of said stop-rod, a gear on said shaft through which said shaft may be rotated, another gear in mesh with said first-named gear, a shaft to which said second gear is fixed, manually operable means for rotating said last named shaft, a resiliently mounted positioning plunger and depressions to receive the outer end of said plunger one on a member secured to a lower part of said stop-rod and the other on an adjacent fixed portion of the apparatus, the end of said positioning plunger adapted to rest in one of said recesses whenever any one of said stops is alined with said lug, a shaft, a rack-gear loose on said last named shaft constantly in mesh with said rack, a clutch slidable on and rotatable with said rack-gear shaft, means on said clutch and rack-gear for rotatably engaging the one with the other, a shifter for said clutch, manually operable means for rotating said clutch shaft, means so securing together said conduit adjusting rod and said rack that they will be raised and lowered simultaneously, said stop-rod and said positioning plunger forced against the action of their resilient mountings to rest simultaneously by the continued lowering of the rack lug against a stop, means operable by the shaft secured to the bottom of a stop-rod for guarding the clutch shifter to prevent disengagement of said clutch and gear excepting when said stop-rod is in lowest position and means operable by the serve-valve opening means for shifting said shifter and disengaging said clutch when said stop-rod is in lowest position.

7. In a liquid dispensing apparatus, the combination of a visible elevated container from which liquid is dispensed, means for supplying liquid to said container, means for draining back to storage excess liquid so supplied, a conduit whose top is within said container and through which conduit the liquid flows from said container, a conduit through which liquid is served, a normally closed serve-valve for said last named conduit, serve-valve opening means, a stop-rod with quantity stops thereon, a lug to engage said stops reciprocable in a plane substantially parallel with said stop-rod and contiguous thereto, means for rotating said stop-rod to aline a selected quantity stop with said lug, means for preventing the radial re-adjustment of said stop-rod when said lug has engaged one of said stops and brought the mechanism to correct quantity dispensing position, means for simultaneously adjusting the height of the top of said conduit and the vertical position of said lug, means for maintaining the conduit and lug reciprocating means in operative condition until the mechanism is adjusted to position to serve the correct quantity of liquid, and means operable by said serve-valve opening means preventing the raising or lowering of said conduit and lug when the mechanism is adjusted to serve correct quantities of liquid.

8. In a liquid dispensing apparatus, the combination of a visible elevated container from which liquid is dispensed, means for supplying liquid to said container, means for draining back to storage excess liquid so supplied, a well into which liquid flows from said container, a vertically adjustable unitary tube whose top is within said container and through which tube the liquid flows from said container into said well, a conduit through which liquid is served, a normally closed serve-valve for said conduit through which liquid is served, serve-valve opening means, a stop-rod with quantity stops thereon, a lug to engage said stops reciprocable in a plane substantially parallel with said stop-rod and contiguous thereto, means for rotating said stop-rod to aline a selected quantity stop with said lug, means for preventing the radial re-adjustment of said stop-rod when said lug has engaged one of said stops and brought the mechanism to correct quantity dispensing position, unitary means for simultaneously adjusting the height of the top of said tube and the vertical position of said lug, means for maintaining the tube and lug reciprocating means in operative condition until the mechanism is adjusted to position to serve the correct quantity of liquid, and means operable by said serve-valve opening means preventing the raising or lowering of said tube and lug when the mechanism is adjusted to serve correct quantities of liquid.

In testimony whereof I have hereunto set my hand.

ARNOLD P. HITZEMAN.